US012630162B2

(12) United States Patent
Shin et al.

(10) Patent No.: US 12,630,162 B2
(45) Date of Patent: May 19, 2026

(54) VEHICLE CONTROL SYSTEM AND METHOD FOR PROTECTING VEHICLE AND DRIVER DURING FORWARD DRIVING WHILE IN REVERSE GEAR FOR ELECTRIC VEHICLE

(71) Applicant: Hyundai Kefico Corporation, Gunpo (KR)

(72) Inventors: Hyung Jin Shin, Seoul (KR); Do In Kwon, Gunpo (KR); Jung Mook Choo, Seoul (KR); Young Ho Jun, Seoul (KR)

(73) Assignee: Hyundai Kefico Corporation, Gunpo (KR)

( * ) Notice: Subject to any disclaimer, the term of this patent is extended or adjusted under 35 U.S.C. 154(b) by 191 days.

(21) Appl. No.: 17/993,409

(22) Filed: Nov. 23, 2022

(65) Prior Publication Data

US 2023/0211784 A1      Jul. 6, 2023

(30) Foreign Application Priority Data

Dec. 30, 2021    (KR) ........................ 10-2021-0193299

(51) Int. Cl.
*B60W 30/18* (2012.01)
*B60W 10/08* (2006.01)
(Continued)

(52) U.S. Cl.
CPC ...... *B60W 30/18127* (2013.01); *B60W 10/08* (2013.01); *B60W 40/105* (2013.01);
(Continued)

(58) Field of Classification Search
CPC ........... B60W 30/18127; B60W 10/08; B60W 40/105; B60W 50/14; B60W 2050/143;
(Continued)

(56) References Cited

U.S. PATENT DOCUMENTS

| | | | | |
|---|---|---|---|---|
| 1,966,000 | A | * | 7/1934 | Briggs ...................... B60T 7/12 |
| | | | | 192/219.2 |
| 4,100,794 | A | * | 7/1978 | Meixner ................. G01L 3/105 |
| | | | | 324/164 |

(Continued)

FOREIGN PATENT DOCUMENTS

| | | | | |
|---|---|---|---|---|
| CN | 104773174 | A | * | 7/2015 ........... B60W 10/06 |
| DE | 19517567 | A1 | | 11/1995 |

(Continued)

OTHER PUBLICATIONS

JP-2016164448-A English translation (Year: 2016).*

(Continued)

*Primary Examiner* — Angelina M Shudy
(74) *Attorney, Agent, or Firm* — Fox Rothschild LLP

(57) ABSTRACT

Provided is a vehicle control method for protecting a vehicle and a driver during forward driving while in reverse gear of an electric vehicle, the vehicle control method including: detecting a gear position of a vehicle; generating a negative torque command to a motor of the vehicle by detecting the gear position as R stage; detecting a vehicle speed of the vehicle; and displaying a warning light or generating a warning sound through a cluster of the vehicle when the vehicle speed is detected as a positive vehicle speed.

11 Claims, 3 Drawing Sheets

(51) Int. Cl.
  *B60W 40/105* (2012.01)
  *B60W 50/14* (2020.01)
(52) U.S. Cl.
  CPC ....... *B60W 50/14* (2013.01); *B60W 2050/143* (2013.01); *B60W 2050/146* (2013.01); *B60W 2510/244* (2013.01); *B60W 2540/10* (2013.01); *B60W 2540/12* (2013.01); *B60W 2710/083* (2013.01)
(58) Field of Classification Search
  CPC ..... B60W 2050/146; B60W 2510/244; B60W 2540/10; B60W 2540/12; B60W 2710/083; B60W 10/10; B60W 30/18036; B60W 2520/10; B60L 2240/12; B60L 15/2018; B60L 2240/32; B60L 2250/10; B60L 15/20; B60L 7/10; B60L 2240/423; B60L 2240/48; B60L 2250/26; B60L 58/12; Y02T 10/72; Y02T 10/70; Y02T 10/7072; B60Q 9/00; B60T 7/042; B60T 2220/04; B60T 2270/60; B60Y 2200/91; B60Y 2400/90; G05D 1/00
  See application file for complete search history.

(56) References Cited

U.S. PATENT DOCUMENTS

| | | | | |
|---|---|---|---|---|
| 4,556,862 A * | 12/1985 | Meinershagen | ......... | B60Q 1/26 340/478 |
| 4,901,055 A * | 2/1990 | Rosenberg | ............ | B60Q 1/441 188/DIG. 1 |
| 5,394,135 A * | 2/1995 | Stadler | ................... | B60R 25/10 340/428 |
| 5,568,024 A * | 10/1996 | Suzuki | ............... | B60L 15/2009 318/430 |
| 5,568,028 A * | 10/1996 | Uchiyama | .......... | G05B 19/4163 318/434 |
| 6,142,582 A * | 11/2000 | Karlsson | ................. | B60T 13/12 303/122.1 |
| 6,193,332 B1 * | 2/2001 | Ono | ........................ | B60T 7/122 303/191 |
| 7,710,252 B2 * | 5/2010 | Kaya | ....................... | B60L 50/16 340/459 |
| 8,249,787 B2 * | 8/2012 | Gierer | ................... | F16H 61/12 701/62 |
| 9,333,844 B2 * | 5/2016 | Mecks | ................. | B60W 20/00 |
| 11,312,366 B2 * | 4/2022 | Yang | .................. | B60W 10/06 |
| 11,351,976 B2 * | 6/2022 | Lee | ................. | B60W 30/18027 |
| 11,505,246 B2 * | 11/2022 | Conrad | ................... | B60D 1/62 |
| 11,667,200 B2 * | 6/2023 | Ohtomo | ................... | B60L 7/14 701/70 |
| 12,179,725 B2 * | 12/2024 | Byeon | ..................... | B60T 7/122 |
| 12,371,022 B2 * | 7/2025 | Lugo-Castillo | .......... | B60L 7/18 |
| 2002/0007974 A1 * | 1/2002 | Nagano | ................... | B60K 6/52 180/243 |
| 2005/0073398 A1 * | 4/2005 | Sayman | ................. | F16H 61/12 340/441 |
| 2005/0096181 A1 * | 5/2005 | DeVore | .............. | B60W 30/186 477/118 |
| 2008/0015758 A1 * | 1/2008 | Gierer | ................... | F16H 61/12 701/51 |
| 2008/0109139 A1 * | 5/2008 | Muta | ................... | B60W 10/115 477/77 |
| 2008/0182710 A1 * | 7/2008 | Shibata | ................... | B60K 6/40 477/3 |
| 2008/0190680 A1 * | 8/2008 | Kaneko | ................. | B60L 58/20 180/170 |
| 2009/0192019 A1 * | 7/2009 | Groner | ................. | B60T 7/122 477/195 |
| 2009/0312929 A1 * | 12/2009 | Doebele | .......... | B60W 30/18118 701/66 |
| 2010/0204893 A1 * | 8/2010 | Gierer | ................... | F16H 61/12 340/456 |
| 2011/0046829 A1 * | 2/2011 | Tamai | ................... | B60W 10/06 701/22 |
| 2011/0083917 A1 * | 4/2011 | Badreddine | ............ | B60L 50/16 180/65.23 |
| 2011/0100739 A1 * | 5/2011 | Pognant-Gros | ..... | B60W 10/184 180/65.265 |
| 2011/0166756 A1 * | 7/2011 | Marcus | ................... | B60T 7/122 903/902 |
| 2011/0202249 A1 * | 8/2011 | Pothin | ................... | B60T 7/122 701/70 |
| 2012/0203433 A1 * | 8/2012 | Higa | ...................... | B60T 7/042 701/50 |
| 2012/0293313 A1 * | 11/2012 | Yu | .......................... | B60Q 9/008 340/425.5 |
| 2012/0296520 A1 * | 11/2012 | Saito | ...................... | B60Q 1/22 701/36 |
| 2013/0085631 A1 * | 4/2013 | Kim | ........................ | B60L 58/13 701/22 |
| 2013/0184979 A1 * | 7/2013 | Karandikar | ............ | G08G 1/168 701/301 |
| 2013/0211683 A1 * | 8/2013 | Philpott | ................... | B60T 7/16 701/70 |
| 2013/0297121 A1 * | 11/2013 | Reed | ................ | B60W 30/18118 180/65.265 |
| 2013/0332042 A1 * | 12/2013 | Beever | ................... | B60T 7/122 701/70 |
| 2014/0277980 A1 * | 9/2014 | Yu | ................... | B60W 30/18118 701/70 |
| 2014/0288757 A1 * | 9/2014 | Hirasawa | .............. | B60W 10/06 180/65.265 |
| 2014/0358400 A1 * | 12/2014 | Whitney | ........ | B60W 30/18136 701/102 |
| 2015/0088351 A1 * | 3/2015 | Meeks | .................. | B60W 20/00 701/99 |
| 2015/0239456 A1 * | 8/2015 | Liggins | .................. | B60K 28/16 701/37 |
| 2015/0375734 A1 * | 12/2015 | Pettersson | ............ | B60W 20/13 701/22 |
| 2016/0082969 A1 * | 3/2016 | Jang | ........................ | B60L 3/12 477/7 |
| 2016/0159359 A1 * | 6/2016 | Kasahara | .......... | F16H 61/66259 701/54 |
| 2016/0297321 A1 * | 10/2016 | Komatsu | ............ | B60L 15/2018 |
| 2016/0318501 A1 * | 11/2016 | Oldridge | .............. | B60W 20/12 |
| 2017/0036669 A1 * | 2/2017 | Kanou | .............. | B60W 30/025 |
| 2017/0166210 A1 * | 6/2017 | Kim | ................ | B60W 30/18027 |
| 2017/0225710 A1 * | 8/2017 | Yu | ................ | B60W 30/06 |
| 2017/0259793 A1 * | 9/2017 | Ohmori | ................ | B60W 30/09 |
| 2017/0305299 A1 * | 10/2017 | Karl | .................... | B60L 15/2045 |
| 2018/0029599 A1 * | 2/2018 | Kim | .............. | B60W 30/18072 |
| 2019/0016346 A1 * | 1/2019 | Park | ........................ | B60K 35/28 |
| 2019/0193740 A1 * | 6/2019 | Han | ................ | B60W 30/18027 |
| 2019/0366873 A1 * | 12/2019 | Fujitake | ................ | B60L 58/13 |
| 2020/0282984 A1 * | 9/2020 | Mizoguchi | .......... | B60W 60/005 |
| 2020/0292062 A1 * | 9/2020 | Kawasaki | ............ | B60W 10/18 |
| 2020/0307392 A1 * | 10/2020 | Joseph | ............... | B60L 50/16 |
| 2020/0398843 A1 * | 12/2020 | Sabbatini | ............... | B60T 7/122 |
| 2021/0086625 A1 * | 3/2021 | Bakewell | ............. | B60W 10/08 |
| 2021/0101492 A1 * | 4/2021 | Oya | .................... | H01M 16/006 |
| 2021/0213942 A1 * | 7/2021 | Kayano | ................. | B60W 30/09 |
| 2021/0370913 A1 * | 12/2021 | Yang | ................. | B60W 10/11 |
| 2022/0024441 A1 * | 1/2022 | Jun | ................ | B60W 30/18127 |
| 2022/0126808 A1 * | 4/2022 | Jeong | ........................ | B60T 8/24 |
| 2022/0126829 A1 * | 4/2022 | Jeong | ................. | B60W 50/14 |
| 2022/0126915 A1 * | 4/2022 | Conrad | ............. | B60W 50/14 |
| 2022/0258704 A1 * | 8/2022 | Byeon | ............. | B60W 30/18036 |
| 2023/0094348 A1 * | 3/2023 | Flotkoetter | ......... | B60W 40/105 340/435 |
| 2023/0150374 A1 * | 5/2023 | Yun | ........................ | B60L 3/102 475/150 |
| 2023/0211784 A1 * | 7/2023 | Shin | ................ | B60W 50/14 701/22 |
| 2023/0303052 A1 * | 9/2023 | Gesang | ................. | B60L 58/20 |
| 2023/0365001 A1 * | 11/2023 | Hiroi | ................. | B60L 15/20 |
| 2023/0366463 A1 * | 11/2023 | Yudell | ................. | F16H 37/021 |
| 2024/0042976 A1 * | 2/2024 | Kirmaier | ................ | B60T 13/68 |
| 2024/0109480 A1 * | 4/2024 | Lerner | ................ | B60Q 1/0035 |

(56) References Cited

U.S. PATENT DOCUMENTS

| 2024/0166188 | A1 * | 5/2024 | Books | ................. | B60W 10/024 |
| 2024/0253653 | A1 * | 8/2024 | Shimomura | .......... | B60W 50/14 |
| 2024/0416949 | A1 * | 12/2024 | Barrera | ................. | B60W 30/16 |
| 2025/0018947 | A1 * | 1/2025 | Yuan | ............... | B60W 30/18159 |
| 2026/0021705 | A1 * | 1/2026 | Masuda | ................ | B60L 3/0061 |

FOREIGN PATENT DOCUMENTS

| DE | 102006030526 | A1 | | 1/2008 | | |
| DE | 102012206147 | A1 | | 10/2013 | | |
| EP | 3075616 | A2 | * | 10/2016 | ............. | B60T 13/66 |
| JP | 2015-039268 | A | | 2/2015 | | |
| JP | 2016-142160 | A | | 8/2016 | | |
| JP | 2016164448 | A | * | 9/2016 | | |
| KR | 10-0254427 | B1 | | 5/2000 | | |
| KR | 10-0721095 | B1 | | 5/2007 | | |
| KR | 10-2014-0050992 | A | | 4/2014 | | |
| KR | 10-1570515 | B1 | | 11/2015 | | |
| KR | 10-2021-0149941 | A | | 12/2021 | | |
| WO | WO-2006122624 | A1 | * | 11/2006 | ............ | B60W 50/14 |

OTHER PUBLICATIONS

CN-104773174-A machine translation (Year: 2018).*

WO-2006122624-A1 machine translation (Year: 2006).*

German Office Action for German Patent Application No. 102022213775.2, issued Dec. 4, 2024, with English translation, 9 pages.

* cited by examiner

VEHICLE CONTROL SYSTEM AND METHOD FOR PROTECTING VEHICLE AND DRIVER DURING FORWARD DRIVING WHILE IN REVERSE GEAR FOR ELECTRIC VEHICLE

CROSS-REFERENCE TO RELATED APPLICATIONS

This application claims priority to and the benefit of Korean Patent Application No. 10-2021-0193299 filed in the Korean Intellectual Property Office on Dec. 30, 2021, the entire contents of which are incorporated herein by reference.

TECHNICAL FIELD

The present disclosure relates to a vehicle control system and method for an electric vehicle, and more particularly, to a vehicle control system and method for protecting a vehicle and a driver during forward driving while in reverse gear of an electric vehicle.

BACKGROUND

When a driver drives downhill on a slope, a situation in which the vehicle travels forward due to gravity may occur even though the driver has set the gear position to R stage (reverse gear) due to inexperience in gear manipulation. Recently, this situation has occurred in an internal combustion engine vehicle and has become an issue. The accident occurred because the vehicle warned the driver of an abnormal situation, but the driver did not recognize the abnormal situation, and the driver's braking ability lacks in the situation when due to the characteristic of the internal combustion engine vehicle, the vehicle's engine is turned off due to the load on the engine and the hydraulic brake needs to be operated without using auxiliary power.

Therefore, there is a need for a technology to protect the driver and the vehicle while preventing the vehicle from traveling forward in the state where the driver accidentally sets the gear position to R stage when driving downhill, and the demand is the same for electric vehicles as well as internal combustion engine vehicles.

SUMMARY

The present disclosure has been made in an effort to provide a vehicle control system and method for protecting a driver and a vehicle when the vehicle drives forward in a state where a driver accidentally sets a gear position to R stage (reverse gear) when driving downhill in an electric vehicle.

An object to be solved in the present disclosure is not limited to the aforementioned objects, and other objects not-mentioned herein will be clearly understood by those skilled in the art from descriptions below.

In one aspect, a vehicle control method is provided suitably for protecting a vehicle and a driver during forward driving while in reverse gear of an electric vehicle. The method suitably may comprise: a) generating a negative torque command to a motor of the vehicle by detecting the gear position as R stage (reverse gear); b) detecting a vehicle speed of the vehicle; and c) displaying a warning light or generating a warning sound through a cluster of the vehicle when the vehicle speed is detected as a positive vehicle speed. In aspects, the method may comprise a first step of detecting a gear position of a vehicle and thereafter generating the negative torque command. The detected positive speed can be for example at least 0.25, 0.5, 1, 3, 5, 7, 8, 10, 15 or 20 mph or kph.

An exemplary embodiment of the present disclosure provides a vehicle control method for protecting a vehicle and a driver during forward driving while in reverse gear of an electric vehicle, the vehicle control method including: detecting a gear position of a vehicle; generating a negative torque command to a motor of the vehicle by detecting the gear position as R stage (reverse gear); detecting a vehicle speed of the vehicle; and displaying a warning light or generating a warning sound through a cluster of the vehicle when the vehicle speed is detected as a positive vehicle speed.

The vehicle control method may further include: detecting an operation of a brake pedal of the vehicle; and generating a zero torque command when the operation of the brake pedal is not detected.

The generating of the zero torque command may include generating the zero torque command regardless of whether an accelerator pedal of the vehicle is operated.

The vehicle control method may further include generating a regenerative braking command when the operation of the brake pedal is not detected.

The vehicle control method may further include generating a regenerative braking command when a State of Charge (SOC) of a battery of the vehicle is equal to or less than a reference value, and maintaining the zero torque command when the SOC of the battery of the vehicle is greater than the reference values.

Another exemplary embodiment of the present disclosure provides a vehicle control system for protecting a vehicle and a driver during forward driving while in reverse gear of an electric vehicle, the vehicle control system including: a gear detection unit for detecting a gear position of the vehicle; a vehicle speed detection unit for detecting a vehicle speed of the vehicle; and a vehicle control unit for generating a torque command to a motor of the vehicle, in which when the gear position is detected as R stage to generate a negative torque command and the vehicle speed is detected as a positive vehicle speed, the vehicle control unit displays a warning light or generates a warning sound through a cluster of the vehicle.

The vehicle control system may further include a brake pedal detection unit for detecting the operation of a brake pedal of the vehicle, in which the vehicle control unit may generate a zero torque command when the operation of the brake pedal is not detected.

The vehicle control system may further include an accelerator pedal detection unit for detecting an operation of an accelerator pedal of the vehicle, in which the operation of the brake pedal is not detected, the vehicle control unit may generate the zero torque command regardless of whether the accelerator pedal is operated.

The vehicle control unit may further generate a regenerative braking command when the operation of the brake pedal is not detected.

The vehicle control unit may generate a regenerative braking command when a State of Charge (SOC) of a battery of the vehicle is equal to or less than a reference value, and maintain the zero torque command when the SOC of the battery of the vehicle is greater than the reference value.

According to the present disclosure, when the vehicle travels forward in a state in which a driver erroneously sets the gear position to R stage when driving downhill in an electric vehicle, it is possible to effectively protect the driver and the vehicle. Additionally, some methods and systems may be executed by at least one controller. For instance, a method may comprise one or more of which may be via a controller such as a) optional step of detecting via a controller a gear position of a vehicle; b) generating via a controller a negative torque command to a motor of the vehicle by detecting the gear position as R stage; c) detecting via a controller a vehicle speed of the vehicle; and d) displaying via a controller a warning light or generating a warning sound through a cluster of the vehicle when the vehicle speed is detected as a positive vehicle speed.

The term "controller" refers to a hardware device including a memory and a processor executing one or more steps interpreted as an algorithmic structure.

The memory may store the algorithm steps, and the processor may specifically execute the algorithm steps to perform one or more processes described below.

In further aspects, vehicles are provided that comprise a vehicle control system as disclosed herein and/or are configured to carry out a method as disclosed herein.

The effects of the present disclosure are not limited to the effects mentioned above, and other effects not mentioned will be clearly understood by those skilled in the art from the following description.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

Figure 1:
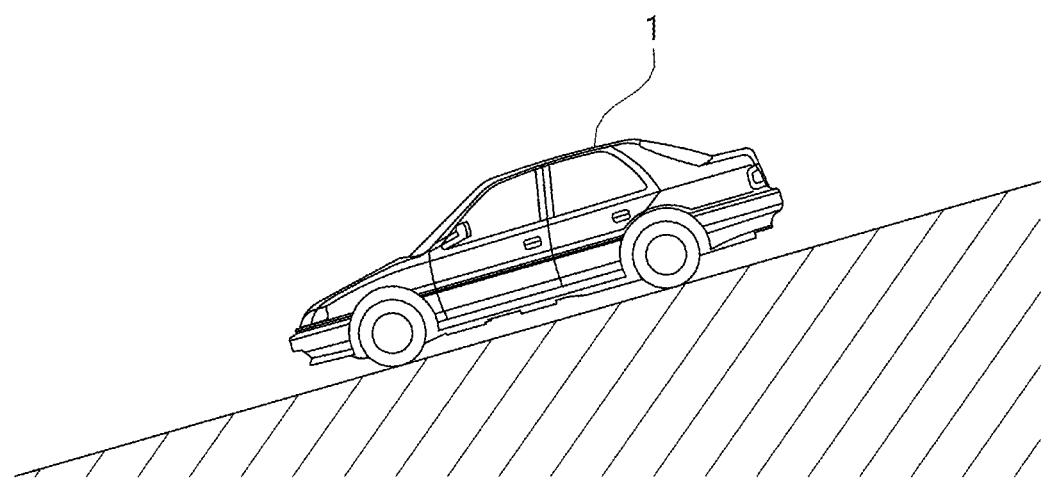
FIG. 1 is a diagram illustrating a downhill travelling situation of a vehicle to which the present disclosure is applied.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the drawings. In the following description and the accompanying drawings, substantially the same components are denoted by the same reference numerals respectively, and thus redundant descriptions will be omitted. In addition, in the description of the present invention, if it is determined that a detailed description of a related known function or configuration may unnecessarily obscure the gist of the present invention, a detailed description thereof will be omitted.

FIG. 1 is a diagram illustrating a downhill travelling situation of a vehicle (electric vehicle) to which the present disclosure is applied. As illustrated in the drawing, when a driver erroneously sets a gear position to R stage (reverse gear) when a vehicle 1 travels downhill and creeps without stepping on an accelerator pedal (or does not sufficiently press the accelerator pedal), even though the gear position is in R stage, a situation in which the vehicle travels forward due to gravity may occur. The present disclosure provides a vehicle control system and method capable of protecting a driver and a vehicle in such a situation.

Figure 2:
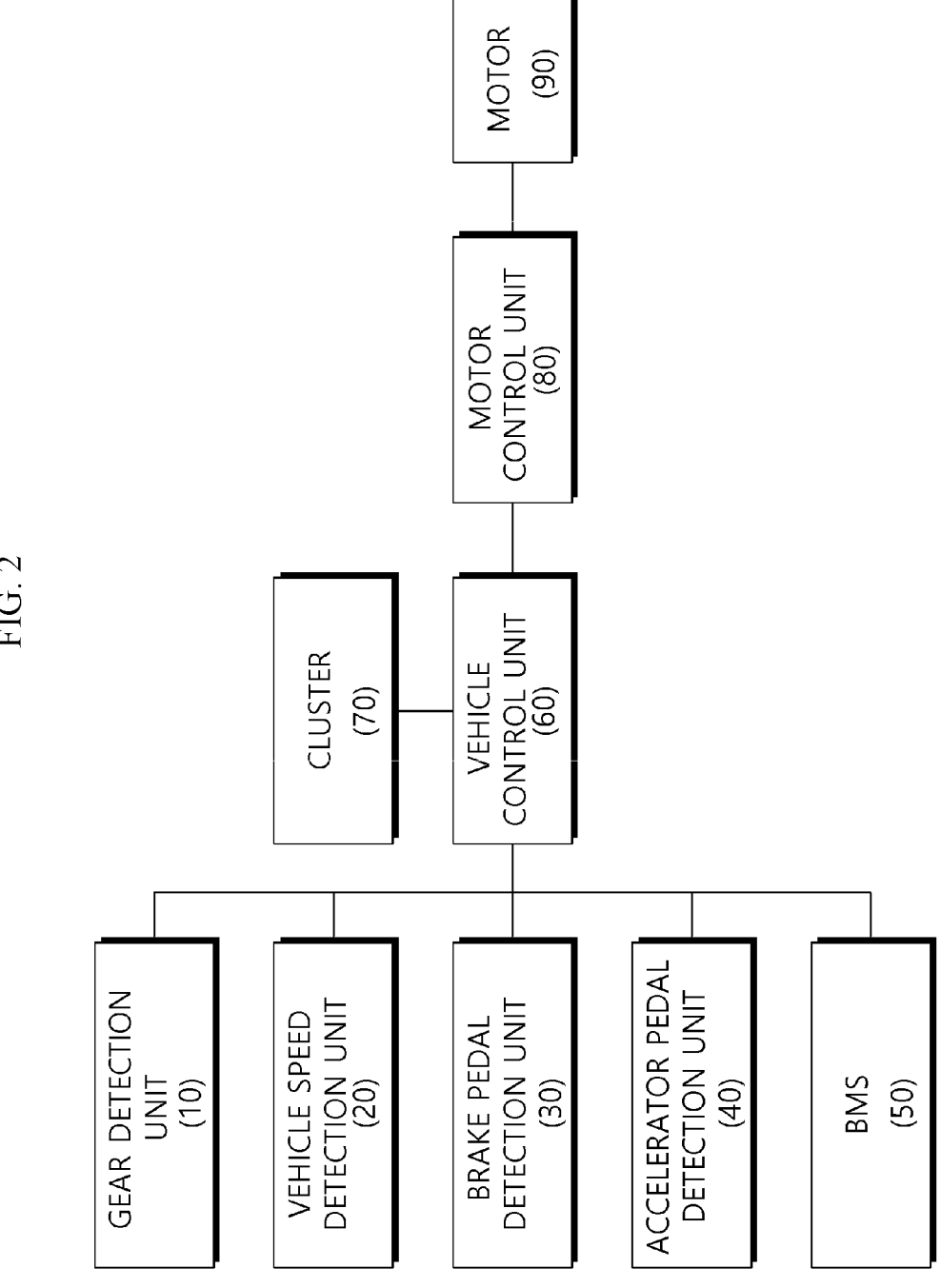
FIG. 2 is a block diagram of a vehicle control system according to an embodiment of the present invention.

FIG. 2 is a block diagram of a vehicle control system according to an embodiment of the present invention. The vehicle control system according to the present embodiment suitably includes a gear detection unit 10, a vehicle speed detection unit 20, a brake pedal detection unit 30, an accelerator pedal detection unit 40, a battery management system (BMS) 50, a vehicle control unit 60, a cluster 70, a motor control unit 80, and a motor 90.

The gear detection unit 10 suitably detects a gear position of the vehicle 1 and outputs a signal corresponding to the gear position.

The vehicle speed detection unit 20 suitably detects a vehicle speed of the vehicle 1 and outputs a signal corresponding to the vehicle speed. The vehicle speed detection unit 20 may be configured as a sensor for detecting the speed of the wheel of the vehicle 1.

The brake pedal detection unit 30 suitably detects the operation of the brake pedal and outputs a signal corresponding to the amount of operation of the brake pedal.

The accelerator pedal detection unit 40 suitably detects the operation of the accelerator pedal and outputs a signal corresponding to the amount of operation of the accelerator pedal.

The BMS 50 suitably monitors, controls, and manages a battery, measures the state of charge (SOC) of the battery, and outputs a signal corresponding to the SOC.

The vehicle control unit 60 suitably determines a driving mode based on signals from the gear detection unit 10, the vehicle speed detection unit 20, the brake pedal detection unit 30, the accelerator pedal detection unit 40, the BMS 50, and the like, and generates a torque command or a regenerative braking command for the motor 90 and outputs the generated torque command or regenerative braking command to the motor control unit 80. The vehicle control unit 60 may calculate the required torque in consideration of the driving mode (acceleration, deceleration, coasting, cruise, creep, and the like), a front/rear wheel distribution ratio, a vehicle state, and the like.

The motor control unit 80 suitably controls the torque of the motor 90 or performs regenerative braking according to a torque command or a regenerative braking command from the vehicle control unit 60.

A detailed operation of the vehicle control system according to the present embodiment will be described in more detail below with reference to FIG. 3.

Figure 3:
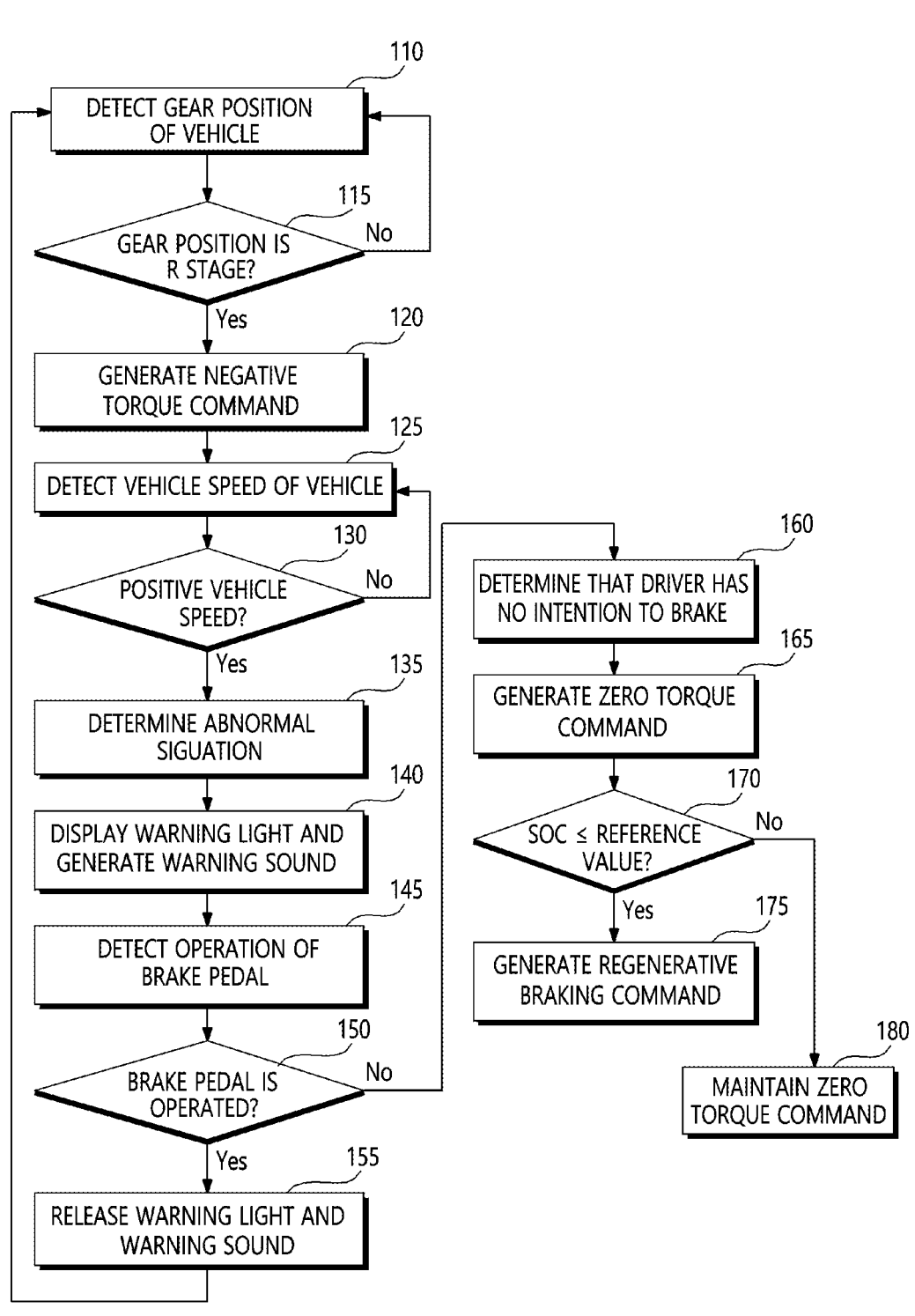
FIG. 3 is a flowchart of a vehicle control method according to an embodiment of the present invention.

FIG. 3 is a flowchart of a vehicle control method according to an embodiment of the present invention.

In operation 110, the vehicle control unit 60 suitably detects a gear position of the vehicle 1 through the gear detection unit 10.

If the gear position is detected as R stage (reverse gear) by mistake of the driver's manipulation of the gear lever (or button) in operation 115, the vehicle control unit 60 generates a negative (that is, reverse direction) torque command in operation 120. That is, when an operation of the accelerator pedal is detected by the accelerator pedal detection unit 40, a negative torque command corresponding to the detected operation of the accelerator pedal is generated, and when the operation of the accelerator pedal is not detected, a negative creep torque command is generated.

In operation 125, the vehicle control unit 60 detects the vehicle speed of the vehicle 1 through the vehicle speed detection unit 20.

In a normal reverse driving situation in R stage (reverse gear), when a negative torque is generated, a negative vehicle speed will also be generated. However, when a negative torque is generated and a positive vehicle speed is generated, the motor 90 rotates in the opposite direction while the vehicle 1 travels forward downhill. As such, when the external force is applied and the motor 90 which is to rotate in one direction rotates in the opposite direction, serious damage to the motor 90 may occur, which is a factor causing loss due to vehicle failure and threatening driving safety of the driver.

Accordingly, when the positive (that is, forward direction) vehicle speed of the vehicle 1 is detected in operation 130, the vehicle control unit 60 determines that the vehicle is abnormal in operation 135. In operation 140, the vehicle control unit 60 displays a warning light through the cluster 70 of the vehicle 1 and generates a warning sound to notify the driver of an abnormal situation.

In operation 145, the vehicle control unit 60 detects the operation of the brake pedal through the brake pedal detection unit 30.

When the driver operates the brake pedal in response to the warning light or the warning sound in operation 150, the vehicle control unit 60 releases the warning light and the warning sound in operation 155.

However, when the operation of the brake pedal is not detected in operation 150, the vehicle control unit 60 determines that the driver has no will to brake in operation 160 and generates a zero torque command in operation 165. At this time, the vehicle control unit 60 generates the zero torque command regardless of the operation of the accelerator pedal detected by the accelerator pedal detection unit 40, that is, whether the driver presses the accelerator pedal or not. Then, the motor control unit 80 controls the torque of the motor 90 to zero, so that the vehicle 1 is in a state of coasting. At this time, since the vehicle 1 is traveling downhill, the vehicle speed has a positive value.

And in operation 170, when the SOC detected from the BMS 50 is equal to or less than a predetermined reference value (for example, around 90%) (that is, when regenerative braking is possible), the vehicle control unit 60 generates a regenerative braking command in operation 175. Then, the motor control unit 80 performs regenerative braking of the motor 90. When the regenerative braking is performed while the driver is driving downhill without recognizing the abnormal situation, the driver instantly feels that the vehicle 1 is being pulled from behind. This is a situation not intended by the driver, and even when the driver shows a willingness to accelerate, such as stepping on the accelerator pedal, a change in driving feeling occurs in which the vehicle 1 does not accelerate and the speed of the vehicle 1 decreases, so that the driver may recognize the abnormal situation. That is, even if a driver overlooks a warning light or a warning sound, the driver is capable of recognizing the abnormal situation through the feeling of his/her whole body rather than audio and visual.

When the regenerative braking cannot be performed because the SOC from the BMS 50 is not equal to or less than the reference value (for example, around 90%) in operation 170, the vehicle control unit 60 maintains the zero torque command to maintain the coasting state in operation 180. Since the function of the motor 90 is not damaged in the coasting state, the brake function may also operate normally. Therefore, even when the driver drives without recognizing the abnormal situation, the driver is capable of maintaining the control of the vehicle without loss of the vehicle or an accident.

According to the embodiment of the present invention, in the case of driving forward downhill with the gear position in R stage due to driver's error in an electric vehicle, it is possible to notify the driver of an abnormal situation through a warning light or a warning sound, and in this case, even when the driver does not recognize the abnormal situation, a change in the driving feeling is provided to the driver through regenerative braking, so that the driver is capable of recognizing abnormal situations through the feeling of his/ her whole body, and even when the regenerative braking is impossible, it is possible to prevent damage to the motor of the vehicle by generating and maintaining a zero torque command.

Combinations of each block in the block diagram and each step in the flowchart attached to the present disclosure may be performed by computer program instructions. These computer program instructions may be embodied in a processor of a general purpose computer, special purpose computer, or other programmable data processing equipment, so that the instructions executed by the processor of the computer or other programmable data processing equipment generate means for performing the functions described in each block of the block diagram or in each step of the flowchart. These computer program instructions may also be stored in a computer-usable or computer-readable memory that may direct a computer or other programmable data processing equipment to implement a function in a particular manner, so that it is also possible that the instructions stored in the computer-usable or computer-readable memory produce articles containing instruction means for performing the function described in each block of the block diagram or in each step of the flowchart. The computer program instructions may also be mounted on a computer or other programmable data processing equipment, so that the instructions for performing a computer or other programmable data processing equipment by performing a series of operational steps on a computer or other programmable data processing equipment to create a computer-executed process to perform the computer or other programmable data processing equipment may provide operations for executing functions described in in each block of the block diagram and each operation of the flowchart.

Each block or each step may represent a portion of modules, segments, or codes including one or more executable instructions for executing specified logical function(s). It should also be noted that in some alternative embodiments, it is also possible for the functions mentioned in blocks or steps to occur out of order. For example, it is possible that two blocks or steps shown one after another may in fact be performed substantially simultaneously, or that the blocks or steps may sometimes be performed in the reverse order according to the corresponding function.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Accordingly, the embodiments disclosed in the present disclosure are not intended to limit the technical spirit of the present invention, but to illustrate, and the scope of the present disclosure is not limited by the embodiment. The scope of the present disclosure shall be construed on the basis of the accompanying claims in such a manner that all of the technical ideas included within the scope equivalent to the claims belong to the present invention.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present invention, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A vehicle control method for protecting a vehicle and a driver during forward driving while in reverse gear of an electric vehicle, the vehicle control method comprising:
   detecting a gear position of the vehicle as a reverse (R) stage;
   generating a negative torque command to a motor of the vehicle in response to detecting the gear position as the R stage;
   detecting a vehicle speed of the vehicle after generating the negative torque command;
   in response to detecting the vehicle speed as being positive corresponding to the forward driving of the vehicle, displaying a warning light and generating a warning sound through a cluster of the vehicle; and
   releasing the warning light and the warning sound in response to operation of a brake pedal of the vehicle by the driver.

2. The vehicle control method of claim 1, further comprising:
   detecting an operation of the brake pedal of the vehicle; and
   generating a zero torque command when the operation of the brake pedal is not detected.

3. The vehicle control method of claim 2, wherein the generating of the zero torque command includes generating the zero torque command regardless of whether an accelerator pedal of the vehicle is operated.

4. The vehicle control method of claim 2, further comprising:
   generating a regenerative braking command when the operation of the brake pedal is not detected.

5. The vehicle control method of claim 2, further comprising:
   generating a regenerative braking command when a State of Charge (SOC) of a battery of the vehicle is equal to or less than a reference value, and maintaining the zero torque command when the SOC of the battery of the vehicle is greater than the reference value.

6. A vehicle control system for protecting a vehicle and a driver during forward driving while in reverse gear of an electric vehicle, the vehicle control system comprising:
   a gear detection unit for detecting a gear position of the vehicle;
   a vehicle speed detection unit for detecting a vehicle speed of the vehicle; and
   a vehicle control unit for generating a torque command to a motor of the vehicle,
   wherein when the gear position is detected as a reverse (R) stage, the vehicle control unit is configured to generate a negative torque command, wherein after the vehicle control unit generates the negative torque command, the vehicle speed is detected by the vehicle speed detection unit, and in response to the vehicle speed being positive corresponding to the forward driving of the vehicle, the vehicle control unit is configured to display a warning light and generate a warning sound through a cluster of the vehicle, and wherein the warning light and the warning sound are released in response to operation of a brake pedal of the vehicle by the driver.

7. The vehicle control system of claim 6, further comprising:

a brake pedal detection unit for detecting the operation of the brake pedal of the vehicle, wherein the vehicle control unit generates a zero torque command when the operation of the brake pedal is not detected.

8. The vehicle control system of claim 7, further comprising:

an accelerator pedal detection unit for detecting an operation of an accelerator pedal of the vehicle, wherein when the operation of the brake pedal is not detected, the vehicle control unit generates the zero torque command regardless of whether the accelerator pedal is operated.

9. The vehicle control system of claim 7, wherein the vehicle control unit further generates a regenerative braking command when the operation of the brake pedal is not detected.

10. The vehicle control system of claim 7, wherein the vehicle control unit generates a regenerative braking command when a State of Charge (SOC) of a battery of the vehicle is equal to or less than a reference value, and maintains the zero torque command when the SOC of the battery of the vehicle is greater than the reference value.

11. A vehicle comprising a vehicle control system of claim 6.

* * * * *